United States Patent [19]
Krbec et al.

[11] Patent Number: 6,026,697
[45] Date of Patent: Feb. 22, 2000

[54] SELF ALIGNING DRIVE NUT BRACKET

[76] Inventors: Marianne L. Krbec, 562 Oaklawn Ave., Elmhurst, Ill. 60126; Robert L. Oakley, 5222 N. LeClaire, Chicago, Ill. 60630

[21] Appl. No.: 09/150,421

[22] Filed: Sep. 9, 1998

[51] Int. Cl.[7] .............................. F16H 27/02; F16B 9/00; F16C 11/00
[52] U.S. Cl. ........................ 74/89.15; 403/71; 403/119
[58] Field of Search ....................... 74/89.15; 403/71, 403/70, 68, 119, 157, 161; 384/57

[56]  References Cited

U.S. PATENT DOCUMENTS

| | | | |
|---|---|---|---|
| 3,459,058 | 8/1969 | Fawkes | 74/89.15 |
| 3,575,378 | 4/1971 | Fawkes | 74/89.15 X |
| 4,075,898 | 2/1978 | Carlson, Jr. | 74/89.15 |

*Primary Examiner*—Thomas R. Hannon
*Assistant Examiner*—Colby Hansen
*Attorney, Agent, or Firm*—James Ray & Associates

[57]  ABSTRACT

The invention provides a drive nut bracket for attaching a drive nut to a driven component to move the driven component. The drive nut is moved by a rotating drive screw. The drive nut bracket provides rotational constraint and linear constraint of the drive nut. It has a nut engaging portion pivotally connected to the base. The nut engaging portion has at least one slide surface portion for sliding engagement with the nut so that the nut may slide relative to the nut engaging portion in a direction substantially perpendicular to the pivot axis. The pivot and the slide surface accommodate misalignments of the drive screw and the driven component. The nut engaging portion includes at least one drive force receiving surface portion facing generally along the axis of the drive screw to provide the linear constraint of the drive nut relative to the driven component.

21 Claims, 3 Drawing Sheets

SELF ALIGNING DRIVE NUT BRACKET

CROSS-REFERENCE TO RELATED APPLICATIONS

The invention taught in this patent application is closely related to the following co-pending patent application: Transit Vehicle Door (U.S. application Ser. No. 09/099,260), which was filed on Jun. 18, 1998. This co-pending patent application is assigned to the assignee of the present invention and its teachings are incorporated herein by reference thereto.

FIELD OF THE INVENTION

The present invention relates, in general, to linear drive type mechanisms and, more particularly, the instant invention relates to a linear drive mechanism for a door on a passenger transit vehicle.

BACKGROUND OF THE INVENTION

It is generally well known in the passenger transit vehicle art to employ a door drive mechanism which includes a drive screw engaging a drive nut that is attached to a transit vehicle door so that when the drive screw is rotated such drive nut is moved longitudinally along the drive screw in order to open and close the door. In many instances these drives may have alignment problems which can result in detrimental loads being applied between the drive nut and the drive screw in directions perpendicular to such drive screw. This is particularly the case in a passenger transit vehicle which is not built to close dimensional tolerances and which may also undergo flexure due to a load of passengers.

Any misalignment of the system can significantly increase the friction between the drive nut and the drive screw. This increased friction increases the torque needed to turn the drive screw. Misalignment also increases stresses which may cause premature wear of bearings, fatigue, etc. It may also cause binding of the drive nut and drive screw.

SUMMARY OF THE INVENTION

In a first aspect, the present invention provides a drive nut bracket for attaching a drive nut to a driven component in order to move the driven component in a drive direction. The drive nut is engaged with a drive screw which is aligned substantially parallel to the drive direction. When the drive nut moves as the drive screw is rotated the drive nut bracket provides rotational constraint, thus, preventing the drive nut from rotating about the axis of the drive screw. The drive nut bracket also provides linear constraint of the drive nut along the axis of the drive screw between the drive nut and the driven component. Rotation of the drive screw causes motion of the drive nut parallel to the axis of the drive screw and hence causes movement of the driven component in the drive direction. The drive nut bracket has a base for attachment to the driven component. Such base includes at least one base pivot portion which has an axis substantially parallel to the drive direction. The bracket further includes at least one rotatable pivot portion, having a pivotal connection to the base pivot portion(s), to be rotatable about the pivot axis relative to the base pivot portion(s). The bracket includes a nut engaging portion attached to the rotatable pivot portion(s). Such nut engaging portion having at least one slide surface portion for sliding engagement with the nut so that the nut may slide relative to the nut engaging portion in a direction substantially perpendicular to the pivot axis. With this arrangement, displacements of the driven component relative to the drive screw in a first direction perpendicular to the drive screw and in a second direction perpendicular to the drive screw do not cause loads between the drive nut and the drive screw in the first direction perpendicular to the drive screw, or in the second direction perpendicular to the drive screw. Rotational constraint of the drive nut is provided by the slide surface portion(s). The nut engaging portion further includes at least one drive force receiving surface portion facing generally along the axis of the drive screw to provide the linear constraint of the drive nut relative to the driven component.

In a second aspect, this invention provides a drive nut assembly which includes a drive nut having a threaded bore for engagement with a drive screw to be driven thereby. The drive nut has at least one torsion surface portion for receiving a rotational constraint on the drive nut. Such drive nut further includes a drive force applying surface portion. The drive nut assembly also has a drive nut bracket for attaching such drive nut to a driven component for moving the driven component in a drive direction. The drive nut is engaged with a drive screw aligned substantially parallel to the drive direction. The drive nut moves when the drive screw is rotated and the drive nut bracket provides a rotational constraint which prevents the drive nut from rotating about the axis of the drive screw. The drive nut bracket also provides linear constraint of the drive nut along the axis of the drive screw between the drive nut and the driven component. Rotation of the drive screw causes motion of the drive nut parallel to the axis of the drive screw and hence causes movement of the driven component in the drive direction. The drive nut bracket has a base for attachment to the driven component. Such base includes at least one base pivot portion which has an axis substantially parallel to the drive direction. The bracket further includes at least one rotatable pivot portion having a pivotal connection to the base pivot portion(s) to be rotatable about the pivot axis relative to the base pivot portion(s). The bracket also includes a nut engaging portion attached to the rotatable pivot portion(s). The nut engaging portion includes at least one slide surface portion for sliding engagement with the nut so that the nut may slide relative to the nut engaging portion in a direction substantially perpendicular to the pivot axis. With this arrangement, displacements of the driven component relative to the drive screw in a first direction perpendicular to the drive screw and in a second direction perpendicular to the drive screw do not cause loads between the drive nut and the drive screw in the first direction perpendicular to the drive screw, or in the second direction perpendicular to the drive screw. Rotational constraint of the drive nut is provided by the slide surface portion(s) which engage the torsion surface portion(s) of the drive nut. The nut engaging portion also has at least one drive force receiving surface portion facing generally along the axis of the drive screw to provide the linear constraint of the drive nut relative to the driven component.

OBJECTS OF THE INVENTION

It is, therefore, one of the primary objects of the present invention to provide a linear door drive mechanism having a drive screw and a drive nut attached by a bracket to the door in which loads between the drive nut and drive screw due to any misalignment are at least partially eliminated by a pivoted connection on the bracket.

Another object of the present invention is to provide a linear door drive mechanism having a drive screw and a drive nut attached by a bracket to the door in which the loads between the drive nut and the drive screw due to any misalignment are at least partially eliminated by a sliding connection between the bracket and the drive nut.

Still another object of the present invention is to provide a linear drive mechanism having a drive screw and a drive nut attached by a bracket to the component to be moved by the linear drive mechanism in which the loads between the drive nut and drive screw due to any misalignment are at least partially eliminated by a pivoted connection on the bracket.

Yet another object of the present invention is to provide a linear drive mechanism having a drive screw and a drive nut attached by a bracket to the component to be moved by the linear drive mechanism in which the loads between the drive nut and drive screw due to any misalignment are at least partially eliminated by a sliding connection between the bracket and the drive nut.

A further object of the present invention is to provide a linear drive mechanism in which detrimental friction is substantially reduced.

It is an additional object of the present invention to provide a linear drive mechanism having a drive screw and a drive nut which will significantly reduce premature wear of the drive nut and drive screw.

A further object of the present invention is to provide a linear drive mechanism having a drive screw and a drive nut in which fatigue due to cyclic transverse loads on the drive screw is reduced.

Another object of the present invention is to provide a bracket for connecting a drive nut to a driven component which can be easily assembled and disassembled.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing Figures and with the appended claims.

Figure 1:
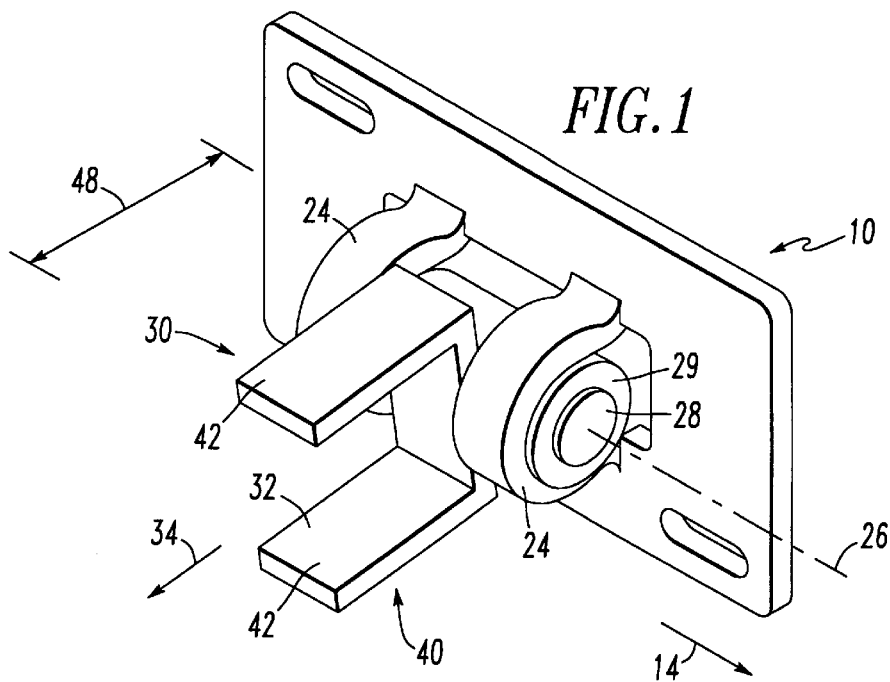
FIG. 1 is a perspective view illustrating a presently preferred embodiment of a drive nut bracket according to the present invention.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing Figures for the sake of clarity and understanding of the invention.

Figure 4:
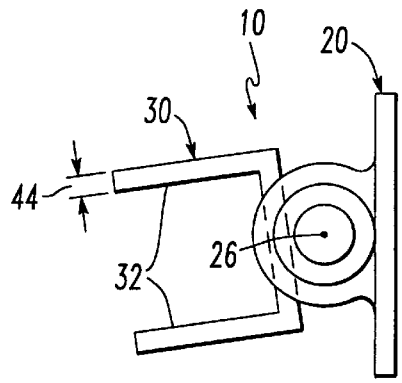
FIG. 4 is a side elevation view of the drive nut bracket illustrated in FIGS. 1–3.
Figure 3:
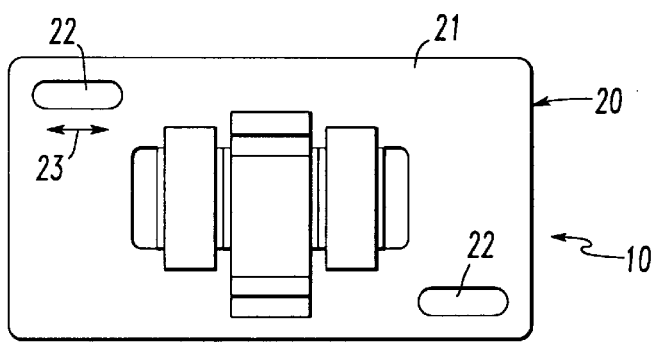
FIG. 3 is a front elevation view of the drive nut bracket illustrated in FIGS. 1 and 2.
Figure 5:
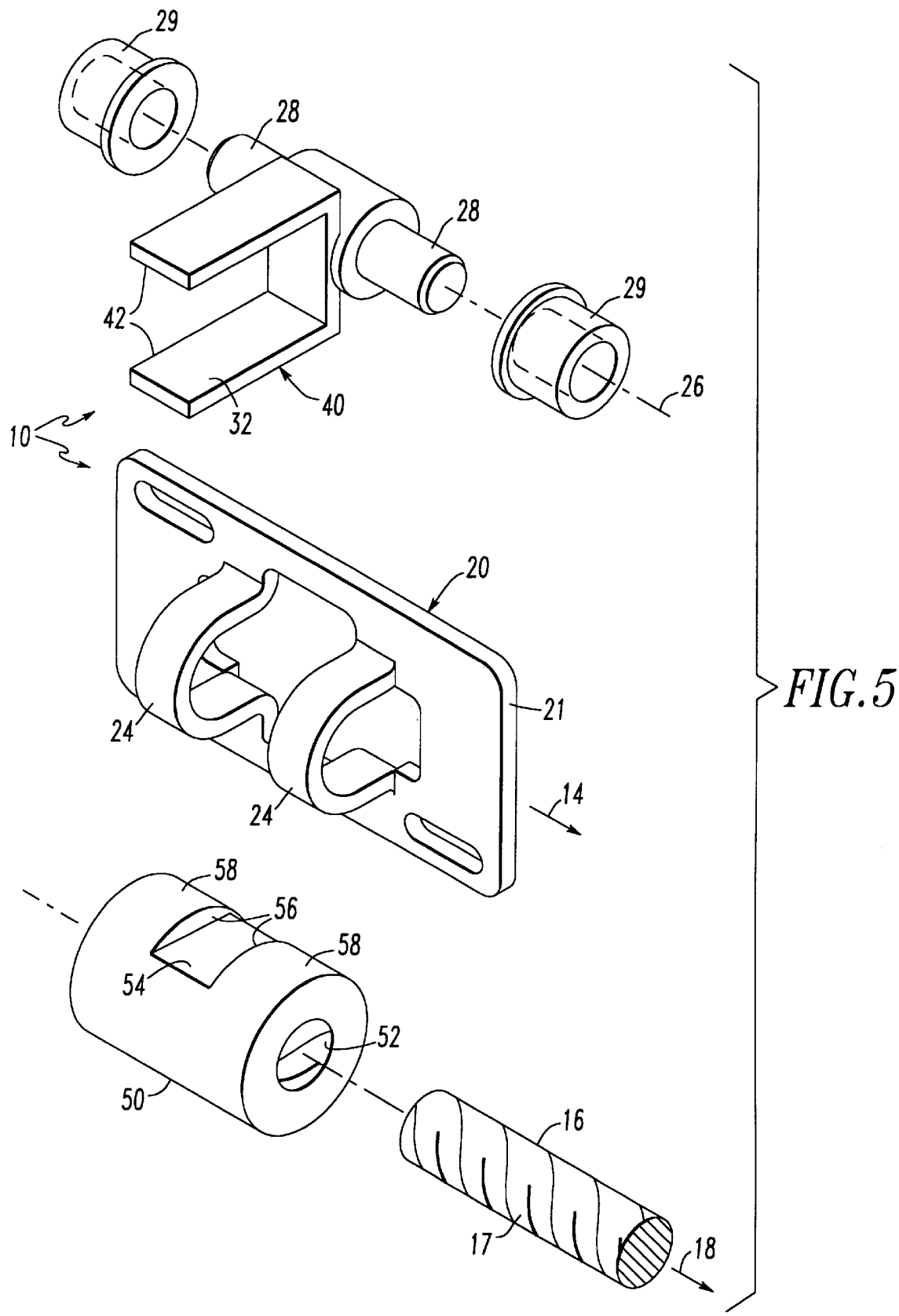
FIG. 5 is an exploded view of a presently preferred embodiment of the invention further showing a drive screw which the drive nut engages.

Attention is now directed to FIGS. 1 through 4 which illustrate the drive nut bracket, generally designated 10, and to FIG. 5 which is an exploded drawing illustrating an assembly of the drive nut bracket 10 with a drive nut 50 and a drive screw 16. In the presently preferred embodiment of the invention, such drive nut bracket 10 includes a base, generally designated 20. Base 20 is attached to a driven component 12 for moving the driven component 12 in a drive direction 14.

The drive nut 50 is engaged with a drive screw 16 having an axis 18 aligned substantially parallel to the drive direction 14. The drive nut 50 moves when the drive screw 16 is rotated and the drive nut bracket 10 provides rotational constraint by one, or more, slide surface portions 32 which prevent the drive nut 50 from rotating about the axis 18 of the drive screw 16. It is preferred that drive nut bracket 10 have two slide surface portions 32 facing in opposite directions, yet facing each other.

The drive nut bracket 10 also provides linear constraint of the drive nut 50 along the axis of the drive screw 18 between the drive nut 50 and the driven component 12. This linear constraint is, preferably, provided by at least one drive force receiving surface portion 38. Rotation of the drive screw 16 causes motion of the drive nut 50 parallel to the axis 18 of the drive screw 16 and hence causes movement of the driven component 12 parallel to the axis 18 of the drive screw 16.

The base 20 of drive nut bracket 10 includes at least one base pivot portion 29 which has an axis 26 disposed substantially parallel to the drive direction 14. The drive nut bracket 10 also has at least one rotatable pivot portion 28, having a pivotal connection to the base pivot portion(s) 29, to be rotatable about the pivot axis 26 relative to the base pivot portion(s) 29. In the presently preferred embodiment shown, there are two base pivot portions 29 which are attached to base plate 21 by two base pivot brackets 24. It is preferred that the base 20 have at least one slot 22 to provide a positional adjustment of drive nut bracket 10 relative to the driven component 12.

The drive nut bracket 10 further includes a nut engaging portion, generally designated 30, attached to the rotatable pivot portion(s) 28. In the presently preferred embodiment of the invention, which is illustrated in the Figures, such nut engaging portion 30 includes a fork, generally designated 40. The nut engaging portion 30 has at least one slide surface portion 32 for sliding engagement with the nut 50, so that the nut 50 may slide relative to the nut engaging portion 30 in a direction 34 disposed substantially perpendicular to the pivot axis 26.

Figure 6:
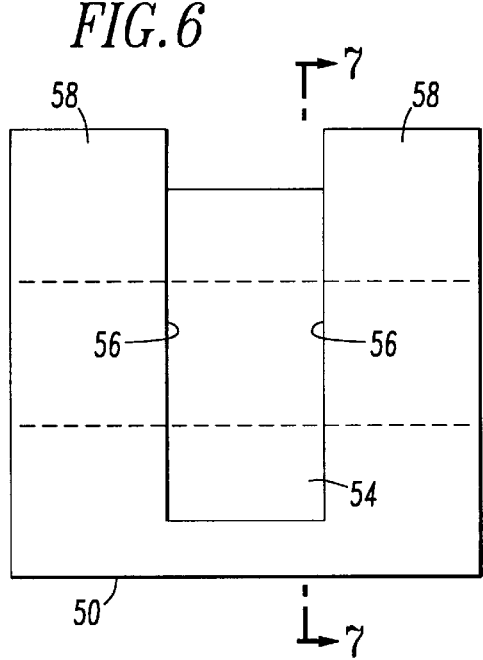
FIG. 6 is a plan view of a drive nut according to a presently preferred embodiment of the invention.
Figure 7:
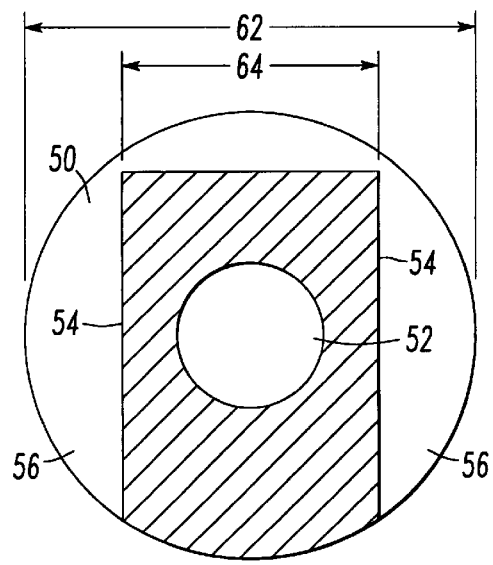
FIG. 7 is a transverse sectional view of the drive nut illustrated in FIG. 6.

Details of a presently preferred nut 50 are shown in FIG. 6, and in FIG. 7 which is a section taken along the lines VII—VII of FIG. 6. These Figures illustrate drive force applying surface portions 56 of nut 50 and torsion surfaces 54. Drive force applying surface portions 56 of nut 50 are engaged with drive force receiving surface portions 38 of nut engaging portion 30. Torsion surfaces 54 of nut 50 are engaged with slide surface portions 32 of nut engaging portion 30.

Figure 8:
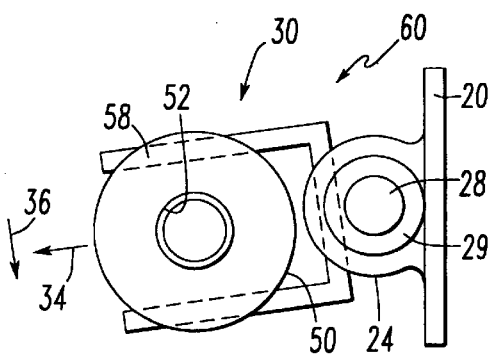
FIG. 8 is a side elevation view showing the drive nut engaging the bracket.

In the preferred embodiment shown, nut engaging portion 30 includes a fork 40 having a pair of tines 42. It is preferred that slide surface portions 32 be on facing surfaces of such tines 42. It is also preferred that drive force receiving surface portions 38 be located along opposite edges of at least one of the tines 42. Nut 50 has a threaded bore 52 for engagement with drive screw 16 which has external thread 17. In the preferred embodiment shown, the nut 50 has cylindrical end portions 58 on which drive force applying surface portions 56 are disposed. Assembly of the drive nut 50 with the drive nut bracket 10 is shown in FIG. 8.

With this particular arrangement, a displacement of the driven component 12 relative to the drive screw 16 in a first direction 34 located perpendicular to the drive screw 16 and in a second direction 36 located perpendicular to the drive screw 16 do not cause loads between the drive nut 50 and the drive screw 16 in the first direction 34, or in the second direction 36.

Figure 2:
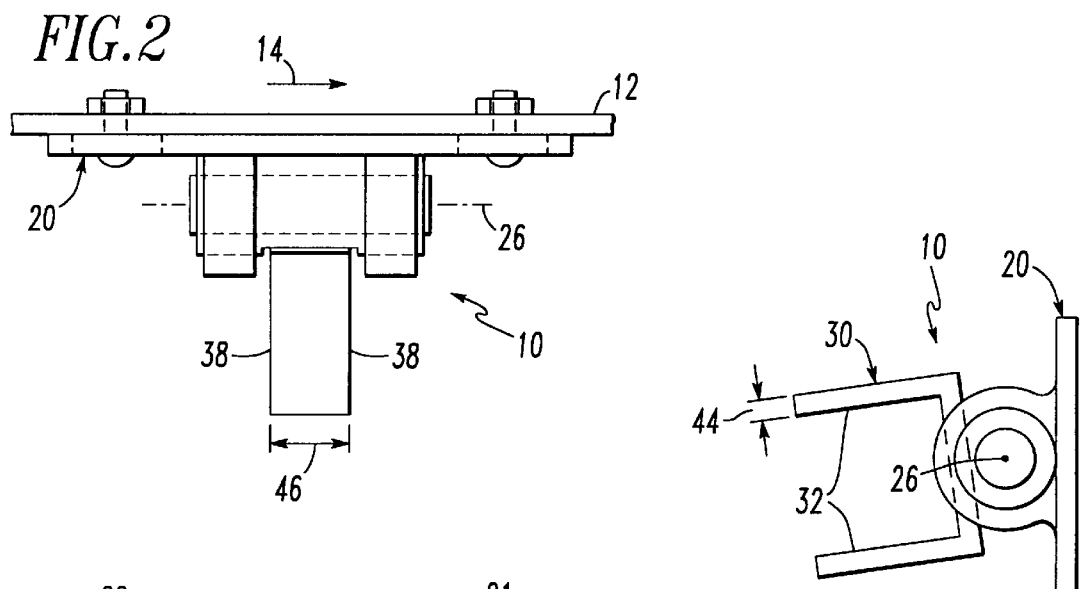
FIG. 2 is a plan view of the drive nut bracket illustrated in FIG. 1 connected to a component to be driven.

In the presently preferred embodiment, tines 42 are generally planar and have each of a predetermined thickness 44, a predetermined width 46 and a predetermined length 48, as shown in FIGS. 1, 2 and 4, respectively. It is preferred that such thickness 44 be less than the width 46 and that such width 46 be less than the length 48. It is preferred that tines 42 be oriented so that the width 46 will be disposed generally parallel to the drive screw 16.

Figure 9:
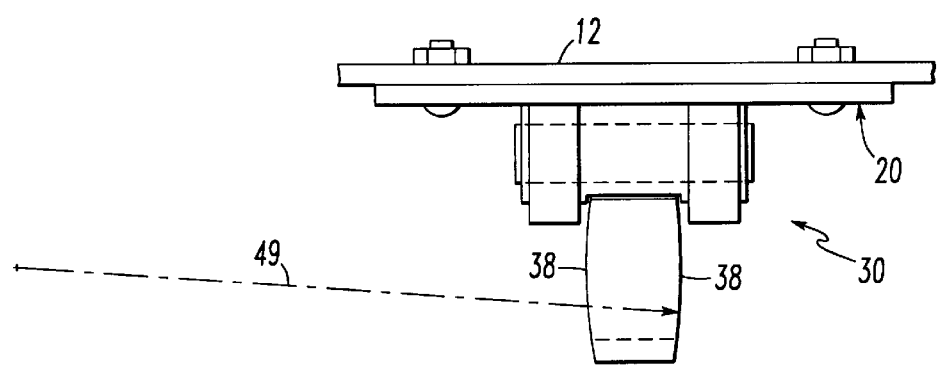
FIG. 9 is a plan view showing a curvature of the tines.

It is presently preferred that drive force receiving surface portions 38 be slightly curved to accommodate any angular misalignment of drive nut bracket 10 and drive nut 50 due to misalignment of driven component 12 and drive screw 16. FIG. 9 shows a radius of curvature 49 of the drive force receiving surface portions 38 which preferably is greater than the width 46 of the tine 42.

It is further preferred that each of the tines 42 have a pair of drive force receiving surface portions 38 and that they be curved to accommodate any angular misalignment of such driven component 12 and drive screw 16.

In addition, it is preferred that the drive nut 50 will include a pair of torsion surfaces 54 which are formed as flats on such drive nut 50. Preferably, these torsion surfaces 54 are disposed on opposite sides of the drive nut 50 and are substantially parallel to each other, as shown in FIG. 7.

Finally, the drive nut 50 has a pair of cylindrical end portions 58 located concentric with a bore 52 of the drive nut 50. It is also preferred that such torsion surfaces 54 be spaced apart from each other by a flat spacing dimension 64 which is less than a diameter 62 of cylindrical end portions 58, as illustrated in FIG. 7.

When this invention is used in a drive system for a transit vehicle door (not shown), the base plate 21 is preferably connected to the door or to a door hanger attached to the door. In this case, slots 22 are used to obtain a desired amount of compression of door seals (not shown) when the door is closed. They may also be used to center the panels in the door opening.

While the presently preferred embodiment of the instant invention has been described in detail above in accordance the patent statutes, it should be recognized that various other modifications and adaptations of the invention may be made by those persons who are skilled in the relevant art without departing from either the spirit or the scope of the appended claims.

We claim:

1. A drive nut bracket for attaching a drive nut engaged with a drive screw to a driven component in order to move such driven component in a drive direction upon rotation of such drive screw and for providing rotational constraint in order to prevent said drive nut from rotating about an axis of such drive screw, such drive screw being aligned substantially parallel to such drive direction, said drive nut bracket, said drive nut bracket further providing linear constraint of such drive nut along such axis of such drive screw between such drive nut and such driven component so that rotation of such drive screw causing motion of such drive nut parallel to such axis of such drive screw causes movement of such driven component parallel to such drive direction, said drive nut bracket comprising:

(a) a base engageable with such driven component, said base including at least one base pivot portion, said at least one base pivot portion having a pivot axis substantially parallel to such drive direction;

(b) at least one rotatable pivot portion, having a pivotal connection to said at least one base pivot portion, to be rotatable about said pivot axis relative to said at least one base pivot portion;

(c) a drive nut engaging portion attached to said at least one rotatable pivot portion, said drive nut engaging portion having at least one slide surface portion for sliding engagement with such drive nut so that such drive nut may slide relative to said drive nut engaging portion in a direction substantially perpendicular to said pivot axis so that a displacement of such driven component relative to such drive screw in a first direction perpendicular to such drive screw and in a second direction perpendicular to such drive screw do not cause loads between such drive nut and such drive screw in said first direction perpendicular to such drive screw or in said second direction perpendicular to such drive screw, said at least one slide surface portion providing said rotational constraint of such drive nut; and (d) at least one drive force receiving surface portion disposed on said nut engaging portion facing generally along such axis of such drive screw to provide such linear constraint of such drive nut relative to such driven component.

2. A drive nut bracket, according to claim 1, wherein said at least one base pivot portion includes a pair of base pivot portions and said at least one rotatable pivot portion includes a pair of rotatable pivot portions.

3. A drive nut bracket, according to claim 1, wherein said at least one slide surface portion includes two planar slide surface portions facing in opposite directions.

4. A drive nut bracket, according to claim 3, wherein said two planar slide surface portions face each other.

5. A drive nut bracket, according to claim 1, wherein said drive nut engaging portion includes a fork having a plurality of tines and said at least one slide surface portion includes a predetermined plurality of slide surface portions on said plurality of said tines.

6. A drive nut bracket, according to claim 5, wherein said fork includes a pair of tines and said plurality of slide surface portions includes two slide surface portions facing each other, a first one of said slide surface portions being on a first one of said tines and a second one of said slide surface portions being on a second one of said tines.

7. A drive nut bracket, according to claim 6, wherein each of said tines is a generally planar component having each of a predetermined thickness and a predetermined width and a predetermined length, said predetermined thickness being less than said predetermined width and said predetermined width being less than said predetermined length.

8. A drive nut bracket, according to claim 7, wherein for each of said tines said predetermined width is directed substantially parallel to such drive screw.

9. A drive nut bracket, according to claim 8, wherein said at least one drive force receiving surface portion is at least one pair of drive force receiving surface portions disposed along a pair of opposite edges of at least one of said tines.

10. A drive nut bracket, according to claim 9, wherein said drive force receiving surface portions are curved to accommodate misalignments of such drive screw relative to such driven component.

11. A drive nut bracket, according to claim 10, wherein said drive force receiving surface portions have radii of curvature substantially greater than said predetermined width of said tines.

12. A drive nut bracket, according to claim 8, wherein each of said tines has a pair of drive force receiving surface portions disposed along a pair of opposite edges thereof.

13. A drive nut bracket, according to claim 12, wherein said drive force receiving surface portions are curved to accommodate any misalignment of such drive screw relative to such driven component.

14. A drive nut bracket, according to claim 13, wherein said drive force receiving surface portions have radii of curvature substantially greater than said predetermined width of said tines.

15. A drive nut bracket, according to claim 1. wherein said base includes at least one elongated slot to accommodate a fastener means for attaching said base to such driven component, said at least one elongated slot allowing adjustment of said drive nut bracket relative to such driven component.

16. drive nut assembly, said drive nut assembly comprising:
(a) a drive nut having a threaded bore for engagement with a drive screw to be driven thereby;
(b) at least one torsion surface portion disposed on said drive nut for receiving a rotational constraint on said drive nut;
(c) a drive force applying surface portion disposed on said drive nut;
(d) a drive nut bracket engaged with said drive nut for receiving a drive force therefrom, said drive nut bracket including;
  (i) a base engageable with such driven component, said base including at least one base pivot portion, said at least one base pivot portion having a pivot axis substantially parallel to such drive direction,
  (ii) at least one rotatable pivot portion, having a pivotal connection to said at least one base pivot portion, to be rotatable about said pivot axis relative to said at least one base pivot portion,
  (iii) a drive nut engaging portion attached to said at least one rotatable pivot portion, said drive nut engaging portion having at least one slide surface portion for sliding engagement with said drive nut so that said drive nut may slide relative to said drive nut engaging portion in a direction substantially perpendicular to said pivot axis so that a displacement of such driven component relative to such drive screw in a first direction perpendicular to such drive screw and in a second direction perpendicular to such drive screw do not cause loads between said drive nut and such drive screw in said first direction perpendicular to such drive screw or in said second direction perpendicular to such drive screw, said at least one slide surface portion providing said rotational constraint of said drive nut, and
  (iv) at least one drive force receiving surface portion disposed on said nut engaging portion facing generally along such axis of such drive screw to provide such linear constraint of said drive nut relative to such driven component.

17. A drive nut assembly, according to claim 16, wherein said torsion surface portion of said drive nut is at least one flat surface disposed on said drive nut.

18. A drive nut assembly, according to claim 17, wherein said at least one flat surface includes a pair of flat surfaces.

19. A drive nut assembly, according to claim 18, wherein said pair of flat surfaces are substantially parallel to each other and are disposed on opposite sides of said drive nut.

20. A drive nut assembly, according to claim 19, wherein said drive nut includes a pair of cylindrical end portions adjacent said pair of flat surfaces and said drive force applying surface portions of said drive nut are disposed on said cylindrical end portions, said cylindrical end portions being concentric with said bore of said drive nut.

21. A drive nut assembly, according to claim 20, wherein said pair of flat surfaces are spaced apart by a flat spacing dimension and said flat spacing dimension being less than a diameter of said cylindrical end portions of said drive nut.

* * * * *